(No Model.) 2 Sheets—Sheet 1.
S. J. CONKWRIGHT.
GRAIN DRILL.
No. 527,364. Patented Oct. 9, 1894.
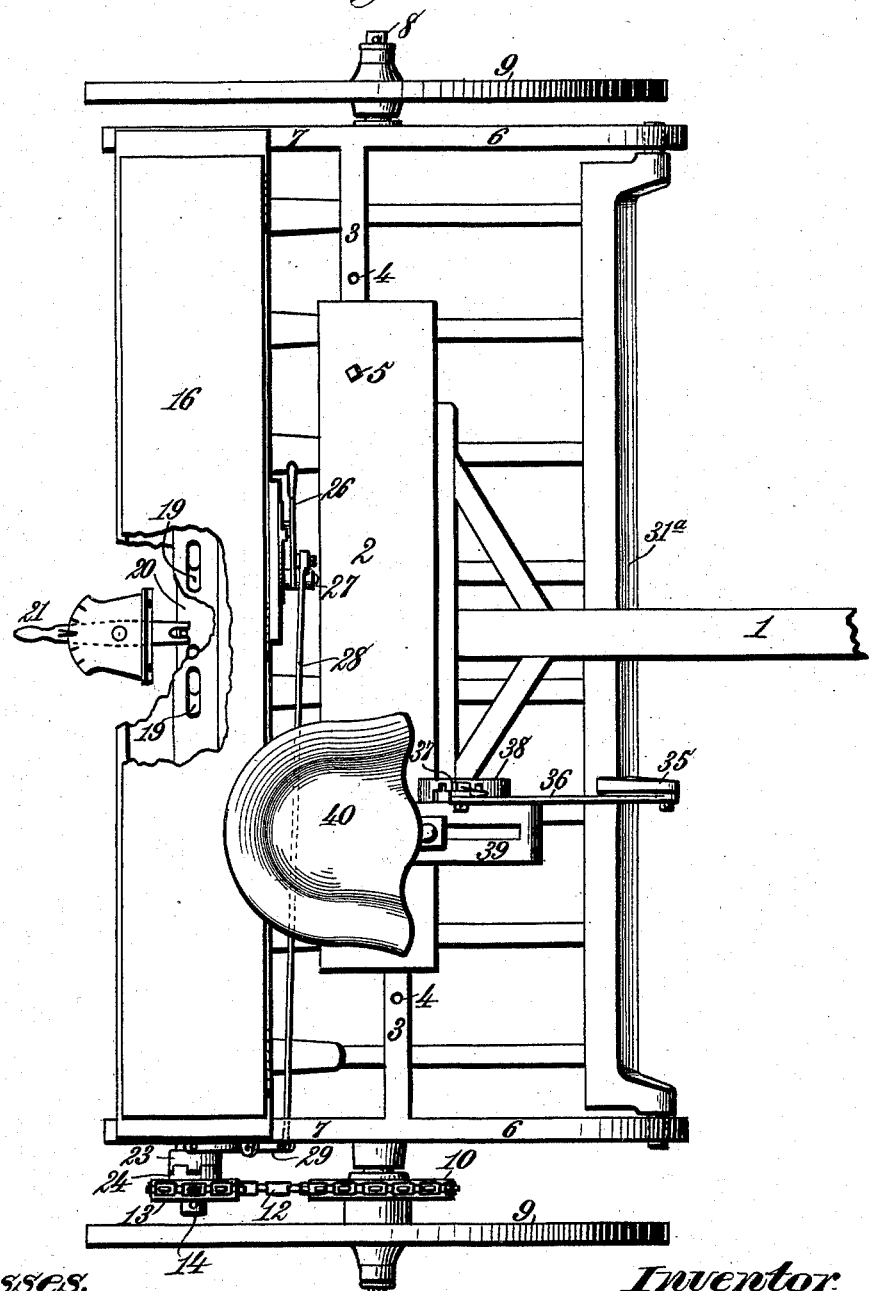
Witnesses.
Robert Eventt
G. W. Rea.
Inventor.
Stonewall J. Conkwright.
By James L. Norris.
Atty.

(No Model.) 2 Sheets—Sheet 2.
S. J. CONKWRIGHT.
GRAIN DRILL.
No. 527,364. Patented Oct. 9, 1894.
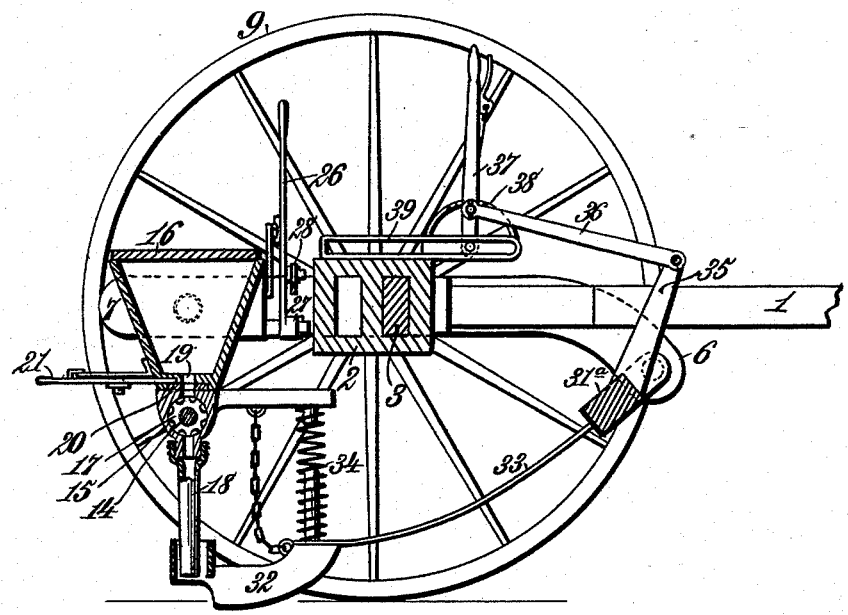
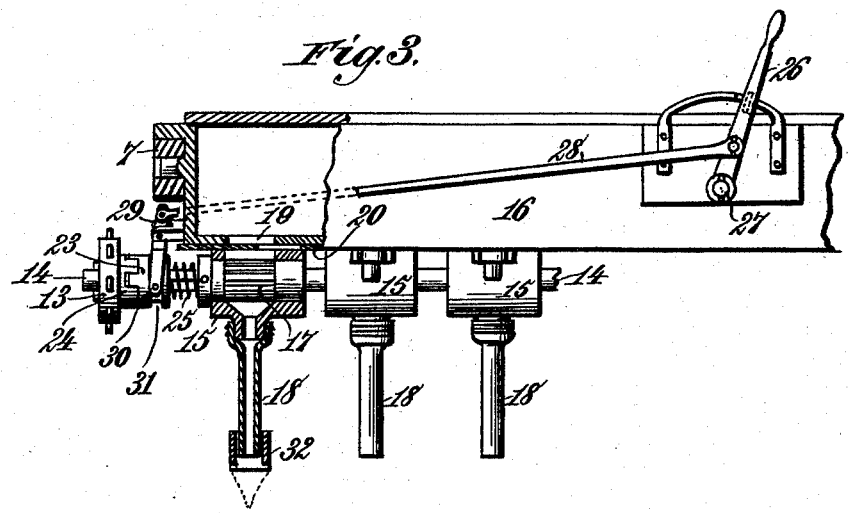
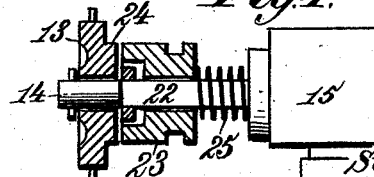
Witnesses
Robt Emritt
G. W. Rea.
Inventor:
Stonewall J. Conkwright.
By James L. Norris
Atty.

UNITED STATES PATENT OFFICE.

STONEWALL J. CONKWRIGHT, OF WINCHESTER, KENTUCKY.

GRAIN-DRILL.

SPECIFICATION forming part of Letters Patent No. 527,364, dated October 9, 1894.

Application filed May 31, 1894. Serial No. 513,060. (No model.)

*To all whom it may concern:*

Be it known that I, STONEWALL J. CONKWRIGHT, a citizen of the United States, residing at Winchester, in the county of Clark and State of Kentucky, have invented new and useful Improvements in Grain-Drills, of which the following is a specification.

This invention relates to that type of grain-drills wherein a seed-wheel shaft extending through seed-cups under a hopper is rotated by the wheel-axle, or by one of the ground-wheels, for uniformly feeding the seed into the drill-tubes.

The object of my invention is to provide novel, simple, efficient, and economical means for rotating the seed-wheel shaft, and stopping and starting the same whenever required.

To accomplish this object my invention consists in the combination or arrangement of parts hereinafter described and claimed, reference being made to the accompanying drawings, in which—

Figure 1 is a broken plan view of a grain-drill embodying my invention. Fig. 2 is a vertical sectional view of the same. Fig. 3 is a detail sectional front elevation of a portion of the hopper and portions of the seed-wheel shaft, seed-cups, and drill-tubes; and Figs. 4 and 5 are detail views of the clutch hereinafter explained.

In order to enable those skilled in the art to make and use my invention, I will now describe the same in detail, referring to the drawings, wherein—

The numeral 1 indicates a pole or tongue which is rigidly connected with a wheel-axle comprising a housing or boxing 2, and axle-sections 3, which are adjustable lengthwise in the housing or boxing, and are provided with perforations 4 through which the locking pins 5 can pass for securing the axle-sections in the position to which adjusted, whereby the width of the machine may be varied if desired.

The axle-sections 3 are provided at their outer ends with forward and rearward projecting arms 6 and 7 and wheel-spindles 8 on which the ground-wheels 9 are adapted to rotate. The hub of one of the ground-wheels is provided with a sprocket-wheel 10, connected by a sprocket-chain or chain-belt 12 with a sprocket-wheel 13 loosely mounted on one end of the seed-wheel shaft 14. The seed-wheel shaft extends horizontally through the seed-cups 15 attached to the lower side of the hopper 16, and each seed-cup contains a seed-wheel 17 which is rigidly attached to the seed-wheel shaft, so that when the shaft rotates the seed-wheels feed the grain or seed into the drill-tubes 18, as usual.

The bottom of the hopper is provided with a series of seed-holes, as at 19, which can be more or less closed by a horizontally movable slide 20, whereby the quantity of seed flowing from the hopper into the seed-cups can be regulated to suit the conditions required. The slide 20 is provided with apertures which can be made to register with the seed-holes 19, and the slide is operated through the medium of a lever 21, Fig. 1, as usual.

The seed-wheel shaft is provided with an angular portion 22, in juxtaposition to the cylindrical portion on which the sprocket-wheel 13 is loosely mounted. A clutch-section 23 is mounted on the angular portion 22 of the shaft, in such manner that while the clutch-section 23 can slide along the length of the shaft, such clutch-section must rotate with the shaft. The loosely mounted sprocket-wheel 13 is provided with a clutch-section 24, and the clutch section 23 is normally held in engagement with the clutch-section 24 through the medium of a suitable spring 25. The sprocket-wheel 10 on the hub of one of the ground-wheels 9 imparts motion to the sprocket-chain or chain-belt 12, which serves to rotate the sprocket-wheel 13, whereby the seed-wheel shaft 14 is rotated for feeding the grain or seed from the seed-cups into the drill-tubes.

In the practical use of the grain-drill it is frequently necessary to stop the rotation of the seed-wheel shaft, so as to temporarily stop the drill of the grain or seed. This is readily accomplished by shifting the clutch-section 23 out of engagement with the clutch-section 24 of the sprocket-wheel 13, whereupon the said sprocket-wheel 13 will rotate on the seed-wheel shaft and without imparting a rotary motion thereto. The sprocket-wheel 13 is under control of the driver through the medium of a hand-lever 26 pivoted to the hopper, as at 27, and connected by a link 28 with a clutch-operating lever 29 having a forked extremity provided with pins, as at 30, projecting into an annular groove 31 in the clutch-section 23, so that the latter can freely rotate, but is susceptible of being shifted on the seed-wheel shaft by the movement of the lever 26. The spring 25 is compressed when the clutch-section 23 is shifted out of engagement with the loosely mounted sprocket-wheel 13, and the clutch-sections may be held disengaged by providing the lever 26 with any suitable locking devices, whereby the rotation of the seed-wheel shaft can be stopped for any length of time. Whenever it is desired to rotate the seed-wheel shaft the lever 26 is released, and the spring 25 will instantly throw the clutch-section 23 into engagement with the loosely mounted sprocket-wheel 13, thereby locking this sprocket-wheel to the seed-wheel shaft, and causing the latter to turn by the action of the sprocket-chain or chain-belt 12 and sprocket-wheel 10 on the hub of one of the ground-wheels.

The hand lever 26 is pivoted at a point within convenient reach of the driver, so that it is possible to instantly disengage the clutch-sections whenever occasion may demand. In a machine of this character the control of the clutch by a direct connection of a lever with the slidable clutch-section is very desirable and important.

The hopper 16 is detachably mounted at its extremities in the rearwardly projecting arm 7, and the head 31ª which carries the drill-shoes 32 is pivotally mounted at its extremities in the forwardly projecting arm 6. The drill-shoes 32 are connected with the head 31ª by arms or rods 33, and the drill-shoes are more or less pressed into the soil to make the furrows through the medium of springs 34, Fig. 2. By detachably mounting the hopper 16 and the head 31ª in the arms 6 and 7, it is possible to remove the grain-drill devices and substitute therefor some other implement, or it is possible to employ hoppers and shoe-carrying heads of varying length, since the axle is lengthwise adjustable, as hereinbefore explained, for the purpose of varying the width of the machine. The head 31ª, which carries the arms or rods 33 of the drill-shoes, is designed to be provided with an upwardly projecting arm 35, connected by a link 36 with a hand-lever 37, whereby it is possible to raise and lower the shoes 32 whenever required. The lever 37 may be locked in any desired position by a suitable catch engaging a segmental plate 38 mounted on a support 39 which carries the seat 40, so that when the support 39 is shifted back or forth to adjust the seat, the locking-plate 38 is carried with said support.

My invention provides very simplified mechanism for rotating the seed-wheel shaft, and stopping and starting the same at the will of the driver. This result has heretofore been accomplished, but, so far as I am aware, the result has not been attained by the very simple and economical devices which I have invented for the purpose.

Having thus described my invention, what I claim is—

The combination with a housing or casing 2 and axle sections 3 adjustable lengthwise in the housing and each provided with a rearwardly projecting arm 7, of ground wheels mounted on spindles, one of which is provided with a sprocket wheel, a hopper having its ends detachably mounted in the rearwardly projecting arms of the axle sections and provided with seed cups, a seed wheel shaft extending through the seed cups and provided at one end with a loosely mounted sprocket wheel, a sprocket chain connecting the two sprocket wheels, a clutch section slidable on but rotatable with the seed wheel shaft and normally held in engagement with the loosely mounted sprocket wheel for locking the latter to the seed wheel shaft, a clutch lever engaging the slidable clutch section, a pivoted swinging lever mounted within convenient reach of the driver, and a link connecting the pivoted swinging lever with the clutch lever, substantially as described.

In testimony whereof I have hereunto set my hand and affixed my seal in presence of two subscribing witnesses.

S. J. CONKWRIGHT. [L. S.]

Witnesses:
 ALBERT H. NORRIS,
 VINTON COOMBS.